US006880028B2

(12) United States Patent
Kurth

(10) Patent No.: US 6,880,028 B2
(45) Date of Patent: Apr. 12, 2005

(54) DYNAMIC REQUEST PRIORITY ARBITRATION

(75) Inventor: Hugh Kurth, Lexington, MA (US)

(73) Assignee: Sun Microsystems, Inc, Santa Clara, CA (US)

( * ) Notice: Subject to any disclaimer, the term of this patent is extended or adjusted under 35 U.S.C. 154(b) by 438 days.

(21) Appl. No.: 10/100,524

(22) Filed: Mar. 18, 2002

(65) Prior Publication Data

US 2003/0177296 A1 Sep. 18, 2003

(51) Int. Cl.[7] .............................................. G06F 12/00
(52) U.S. Cl. ..................................... 710/240; 710/244
(58) Field of Search ................................. 710/240, 244

(56) References Cited

U.S. PATENT DOCUMENTS

| | | | |
|---|---|---|---|
| 5,619,661 A | * 4/1997 | Crews et al. ................ | 710/119 |
| 5,862,353 A | * 1/1999 | Revilla et al. .............. | 710/107 |
| 5,884,051 A | * 3/1999 | Schaffer et al. ............. | 710/107 |
| 5,983,302 A | * 11/1999 | Christiansen et al. ........ | 710/113 |
| 6,088,751 A | * 7/2000 | Jaramillo .................... | 710/116 |
| 6,473,817 B1 | * 10/2002 | Jeddeloh .................... | 710/113 |
| 6,629,220 B1 | * 9/2003 | Dyer .......................... | 711/158 |
| 6,647,449 B1 | * 11/2003 | Watts ......................... | 710/111 |

* cited by examiner

Primary Examiner—Tim Vo
Assistant Examiner—Christopher A Daley
(74) Attorney, Agent, or Firm—Park, Vaughan & Fleming LLP

(57) ABSTRACT

A system and method are provided for dynamically determining the priority of requests for access to a resource taking into account changes in the access needs of a requesting agent over time. A requesting agent selects a priority level from a plurality of priority selections to include with a priority request to an arbiter. Work requests requiring the access to a resource may be stored in a work request queue. The priority level may be dynamic. The dynamic priority level enables the agent to sequentially increase or decrease the priority level of a priority request when threshold values representing the number of work requests in the work request queue are reached. The threshold values which cause the priority level to be increased may be higher than the threshold values which cause the priority level to be decreased to provide hysteresis. The dynamic priority level may, alternatively, enable the agent to start a timer for timing a pending priority request for a predetermined time period. The priority level of the priority request is increased if the priority request has not been granted before the timer expires.

27 Claims, 7 Drawing Sheets

Agent Request Priority Configuration Register Fields

| Field | Description |
|---|---|
| ENABLE | Enable requests |
| PRIORITY | 00 – Dynamic<br>01 – Low<br>10 – Medium<br>11 – High |
| L2M | Queue entry value which transitions low to medium |
| M2L | Queue entry value which transitions medium to low |
| M2H | Queue entry value which transitions medium to high |
| H2M | Queue entry value which transitions high to medium |

FIG. 3

DYNAMIC REQUEST PRIORITY ARBITRATION

TECHNICAL FIELD AND BACKGROUND ART

The present invention relates to an arbitration mechanism for awarding priority to one of a plurality of agents, in particular, a mechanism allowing the agent to dynamically determine the priority level to give to requests for access to a resource.

Where there is a single resource in a computing system whether the resource is a bus, an SRAM, a FIFO, etc., an arbitrator is required to control access to the resource from among a plurality of requesting agents. In accordance with many arbitration schemes, an arbiter assigns a priority level to each request made by the agents and decides which agents get access based on the assigned priority. Typically, requests with higher priority are given preferred access, preempting requests with lower priority. Agents making requests at the same priority level are given access in an equitable or round robin fashion. In these aforementioned arbitration schemes, however, the priority assigned to the agents is just a best guess as to what the current access needs of the agents are. As a result, agents whose access needs change over time (and thus requiring a higher priority) may be starved from access to the resource

SUMMARY OF THE INVENTION

In accordance with various embodiments of the invention a system and method are provided for dynamically determining the priority of requests for access to a resource taking into account changes in the access needs of agents over time.

According to one embodiment, a method is provided for determining the priority of requests to an arbiter for accessing a resource. A priority level is selected from a plurality of priority selections for a priority request. The priority request, including the selected priority level, is made to the arbiter. The priority request having the highest priority level receives access to the resource first. Two or more priority requests having the same priority level may be granted access round-robin. The priority selection may be dynamic. The dynamic priority level may be initially set to a first priority level. The selection of the dynamic priority level increases or decreases the priority level of a priority request based on when threshold values representing the number of work requests awaiting access in a work request queue are reached. The threshold values which cause the priority level to be increased may be higher than the threshold values which cause the priority level to be decreased to provide hysteresis.

According to a further embodiment of the invention, the dynamic priority selection starts a timer for timing a request for a predetermined time period. The request is changed to a higher priority level if the request has not received access to the resource before the timer expires.

A computing system embodiment of the invention includes a resource, a plurality of agents for making priority requests for access to the resource and an arbiter in communication with the agents and the resource. The agents may have a work request queue for storing work requests. The agents assign each priority request a priority level which may be selected from a configuration register. When the dynamic priority level is selected an agent may increase or decrease the priority level of a priority request when certain threshold levels are reached. The threshold levels may correspond to the number of work requests in the work request queue.

In accordance with another embodiment of the invention an agent is provided for determining the priority of requests for access to a resource. The agent includes a configuration register for storing a set of priority levels and a selector for selecting one of the priority levels to assign to a priority request for access. When the dynamic priority level is selected, the agent may automatically increase or decrease the priority level of a priority request based on the number of work requests in the agent's work request queue. The ability of the agent to dynamically change the priority of its own requests can help prevent the agent from being starved from access to the resource.

BRIEF DESCRIPTION OF THE DRAWINGS

The foregoing features of the invention will be more readily understood by reference to the following detailed description, taken with reference to the accompanying drawings, in which:

FIG. 3 is a table illustrating the configuration register of the agent of FIG. 2;

DETAILED DESCRIPTION OF SPECIFIC EMBODIMENTS

Figure 1:
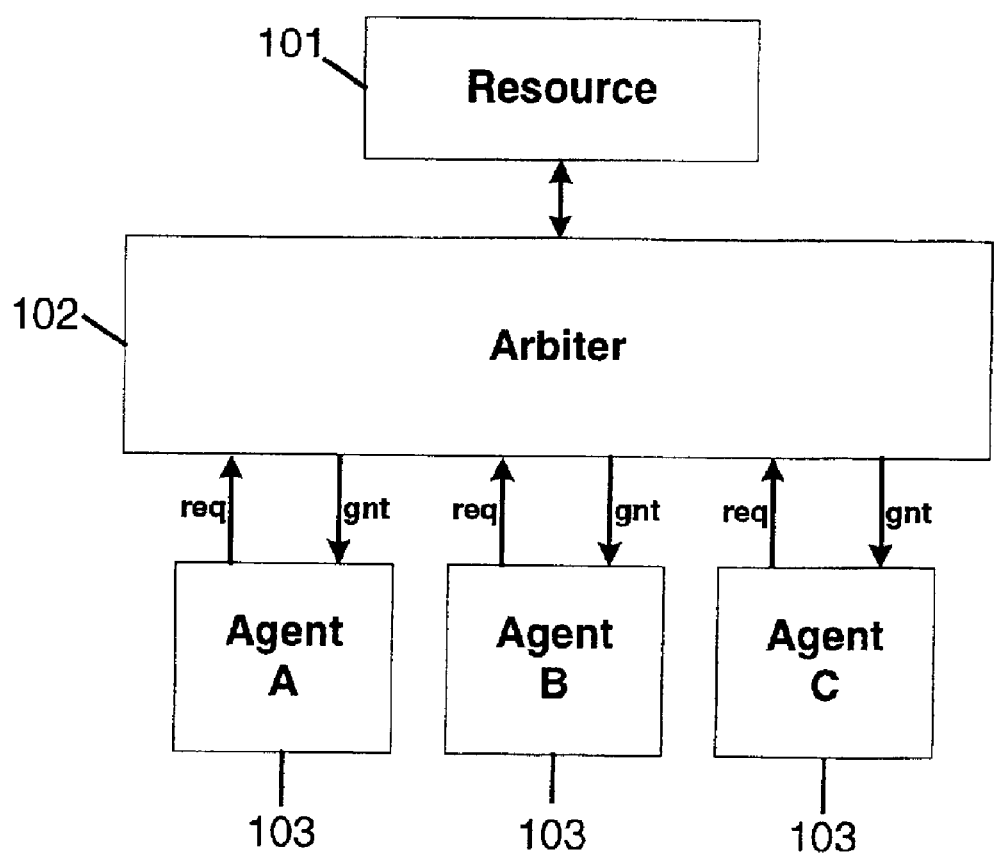
FIG. 1 is a block diagram of a computing system of an embodiment of the present invention.

Referring to FIG. 1, a computing system 100 is shown which includes a plurality of agents 103 for requesting access to resource 101. The resource may be any of a variety of components in the computing system such as a bus, a host controller, a host channel adapter, an SRAM, a FIFO, etc. The computing system 100 also includes an arbiter 102 for deciding which agent receives access to the resource 101 based on the priority of the requests made by the agents. It should be noted that as used herein and in the accompanying claims, a priority request is defined as a solicitation made by an agent for access to the resource. In a presently preferred embodiment, the agents are each in communication with the arbiter through a multiplicity of encoded signal lines that continuously carry a given signal from the agent to the arbiter. An agent makes a priority request to the arbiter with a pre-selected priority level. Priority requests are continuously made on their signal lines until they are granted access. According to an alternative scheme, priority requests may be sent in discrete periodic messages to the arbiter.

Work requests solicit the resource once the priority request has been awarded access to the resource. An agent may store multiple work requests that require resource access in a work request queue until the priority request is granted. Once the agent gains access to the resource the next work request in the work request queue is made for access to the resource.

In the computing system 100, agents 103 send signals to the arbiter indicating a priority request. Priority requests may be any one of several priority levels including low priority, medium priority or high priority. The arbiter 102 utilizes an algorithm employing fixed-priority arbitration among priority levels and round-robin arbitration within a priority level. In fixed-priority arbitration, the arbiter 102 grants first access to agents making high priority requests. If no agent makes a high priority request, then the arbiter 102 grants first access to agents making medium priority requests. If no agent makes a high or medium priority request, then the arbiter 102 grants access to agents making low priority requests. Agents making requests at the same priority share access in round-robin fashion (i.e., the agent which was not previously granted access by the arbiter has priority over the agent which was). Fixed-priority and round-robin arbitration algorithms for determining access are well known to those of ordinary skill in the art. Once priority is determined, the arbiter 102 sends a signal to the appropriate agent granting access to the resource.

Figure 2:
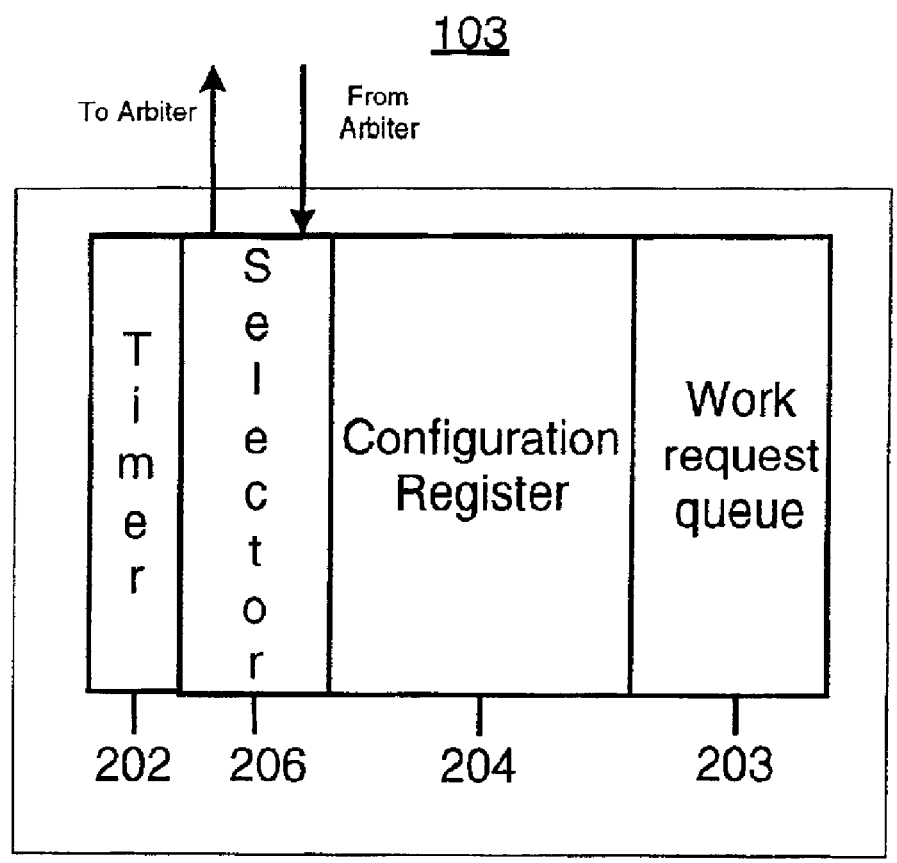
FIG. 2 is a block diagram of the agent illustrated in the computing system of FIG. 1.

Agents 103 determine the priority level of the requests sent to the arbiter using a request priority algorithm. An embodiment of an agent that may be used in the invention is shown in FIG. 2. As shown in FIG. 2, an agent 103 includes a work request queue 203 for storing work requests, a configuration register 204 for storing priority configuration data and a selector 206 for selecting a priority to send in a priority request to the arbiter. The agent 103 may also include a timer 202 (the function of the timer will be explained in greater detail in the description of a further embodiment of the invention with respect to FIG. 6 below).

Configuration register 204 is divided into fields as shown in the table of FIG. 3. The ENABLE indicates whether or not an agent is able to make priority requests. The PRIORITY field stores priority levels (low, medium, high and dynamic). Each priority level is represented by a two-bit code. Depending on the request priority algorithm used, the agent 103 may be programmed to select a fixed priority level (i.e., low, medium or high). In the fixed request priority algorithm all priority requests will be sent to the arbiter at low, medium or high priority. In other embodiments, the agent may be programmed to select the dynamic priority level, that is, the agent automatically increases the priority level of requests as the access needs of the agent change over time. Once the dynamic priority level is selected, a priority request is sent to the arbiter at an initial predetermined priority level. L2M (low-to-medium priority), M2L (medium-to-low priority), M2H (medium-to-high priority) and H2M (high-to-medium priority) are work request queue fields utilized in the dynamic request priority algorithm. The dynamic request priority algorithm may be based upon queue entry threshold values in the work request queue fields. Each threshold value represents the number of work requests in the work request queue that will trigger the agent to change the priority request to a new priority level. In this embodiment, work request queue field L2M stores a first threshold value, M2L stores a second threshold value, M2H stores a third threshold value, and H2M stores a fourth threshold value.

As described above and in accordance with the various embodiments of the invention, the configuration register 204 and the selector 206 are programmable and may be implemented in hardware. The request priority algorithms may be implemented in software and are described below with respect to FIGS. 4–8.

Figure 4:
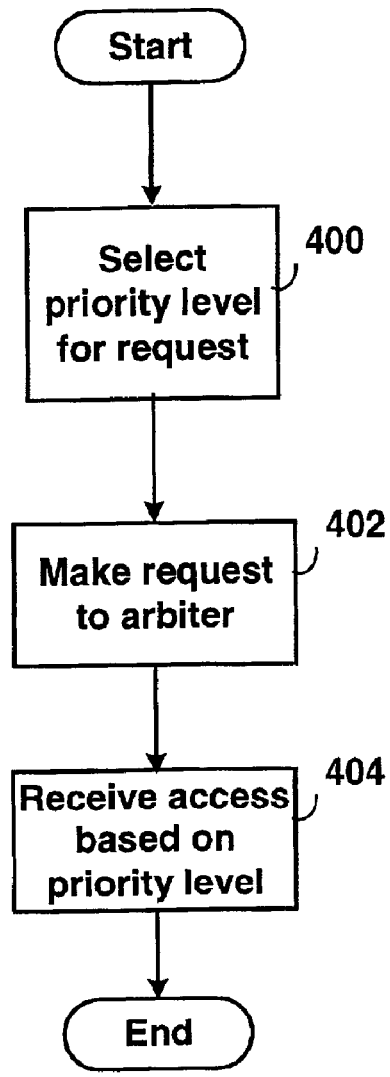
FIG. 4 is a flowchart illustrating a request priority algorithm for an agent in accordance with an embodiment of the invention.

Referring now to FIG. 4, a flowchart illustrates a generic request priority algorithm for an agent in accordance with an embodiment of the invention. The agent selects 400 a priority level from the configuration register. As discussed above, the agent may be programmed to select one of the three fixed priority levels or a dynamic priority level. After selecting the priority level, the agent makes 402 the priority request to the arbiter. Finally, the agent receives 404 access to the resource from the arbiter based on the priority level of the request.

Figure 5A:
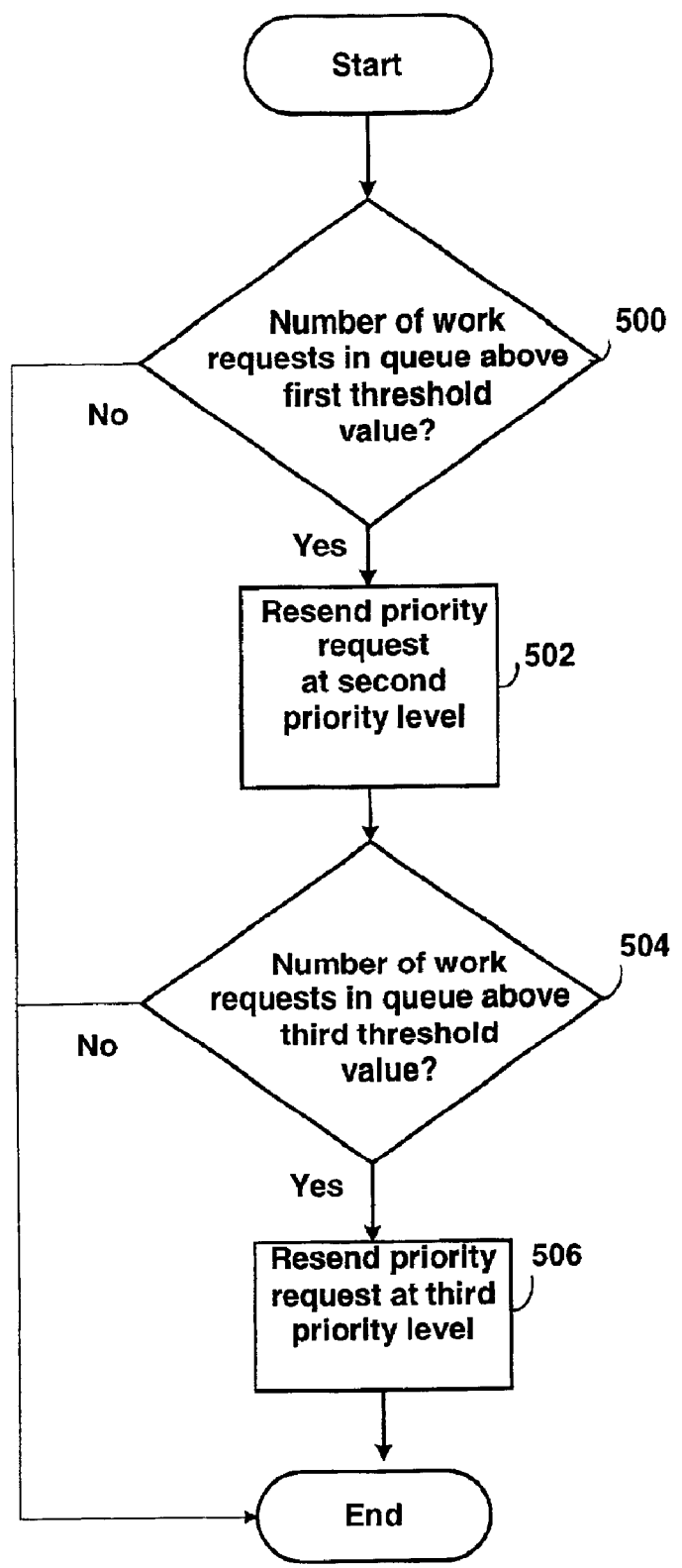
FIGS. 5A and 5B are flowcharts illustrating a dynamic request priority algorithm for an agent in accordance with an embodiment of the invention.
Figure 5B:
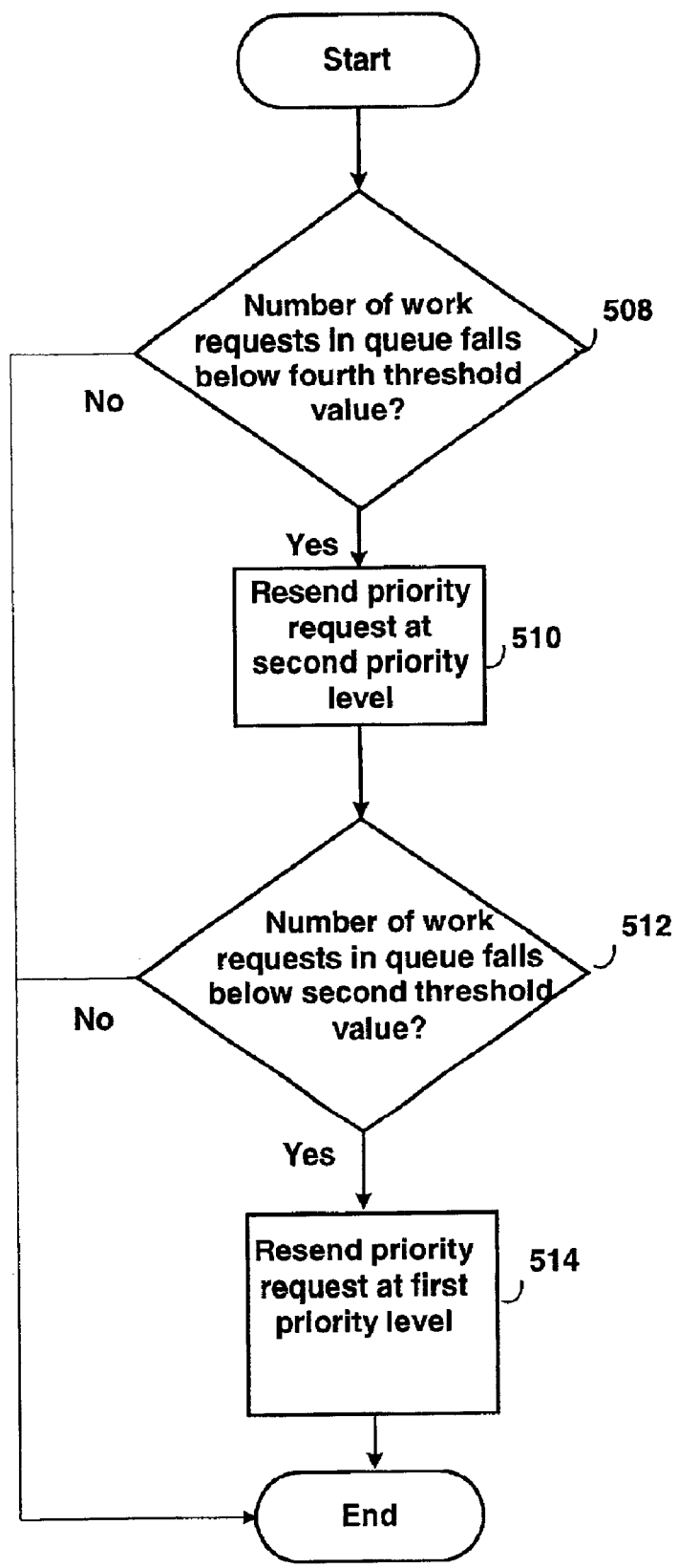

FIGS. 5A and 5B are flowcharts illustrating the dynamic request priority algorithm in accordance with an embodiment of the invention. As discussed above, this algorithm is employed after the agent has selected the dynamic priority level and made a priority request to the arbiter at an initial predetermined priority level. For the purposes of this discussion, the dynamic priority level is initially set at low. Referring now to FIG. 5A, the agent determines 500 if the number of pending work requests in the work request queue rises above the first threshold value (L2M) stored in the work request queue field. If the number of pending work requests in the request queue are below the first threshold value the priority level of the priority request is left unchanged. If however, the number of work requests in the request queue crosses the first threshold value, the agent increases 502 the priority level. In the presently preferred embodiment, the signals on the encoded priority request lines are changed. In an alternate embodiment involving sending of discrete priority request messages, priority is changed by resending the priority request at the second or medium priority level. If after increasing the dynamic priority level, the request still has not been granted access, the algorithm determines 504 whether the number of pending work requests in the queue rises above the third threshold value (M2H) in the request queue field. If the number of work requests are below the third threshold value the priority level of the priority request sent to the arbiter remains unchanged (i.e., the priority request remains at medium priority). If however, the number of pending work requests in the request queue crosses the third threshold value, the agent increases 506 the priority level of the priority request to the third or high priority level. Once the request is granted by the arbiter, the agent gains access to the resource and the next request in the work queue is sent to the arbiter. The priority request algorithm in this embodiment helps to insure that the agent is not starved for access to the resource by dynamically increasing the priority level of priority requests as the request queue fills up, thus increasing the probability that a priority request will be granted access by the arbiter and enabling the agent to empty its queue.

Referring now to FIG. 5B, the agent changes the priority level of a request based on whether the number of pending work requests for access in the request queue falls below a queue threshold value usually through the servicing of those requests by the resource. The work request queue may drop requests due to a variety of external factors. For example, one or more requesting devices in the computing system may decide it no longer needs access to the resource through an agent. If the number of pending work requests in the queue falls below 508 the fourth threshold value (H2M), the priority level is decreased 510 to the second or medium priority level. If the number of pending work requests in the queues falls below 512 the second threshold value (M2L), the priority level is decreased 514 to the first or low priority level. In decreasing priority levels, the request algorithm intelligently regulates the agent's request queue so that it only makes high priority requests when necessary. Thus, the agent is prevented from monopolizing the resource and allows other agents in the computing system to gain access to the resource.

In accordance with an embodiment of the present invention, the queue threshold values are programmable. Software instructions can be used to set the threshold values for each of the work request queue fields L2M, M2L, M2H and H2M. Although each work request queue field may be individually programmed with a desired threshold value it is generally advantageous to set the rising threshold values for fields L2M and M2H higher than the falling threshold values for fields M2L and H2M to provide a hysteresis effect. This prevents the agent from having to constantly shift priority levels due to minute changes in the queue. For example, if L2M has a threshold value of 5 and M2L has a threshold value of 2, the agent would increase the priority level of a priority request from low to medium when the queue reached five or more work requests and would not decrease the priority level from medium to low until the number of work requests in the queue fell to two. The initial priority level for the dynamic request priority algorithm may be programmed to be any fixed priority level.

Figure 6:
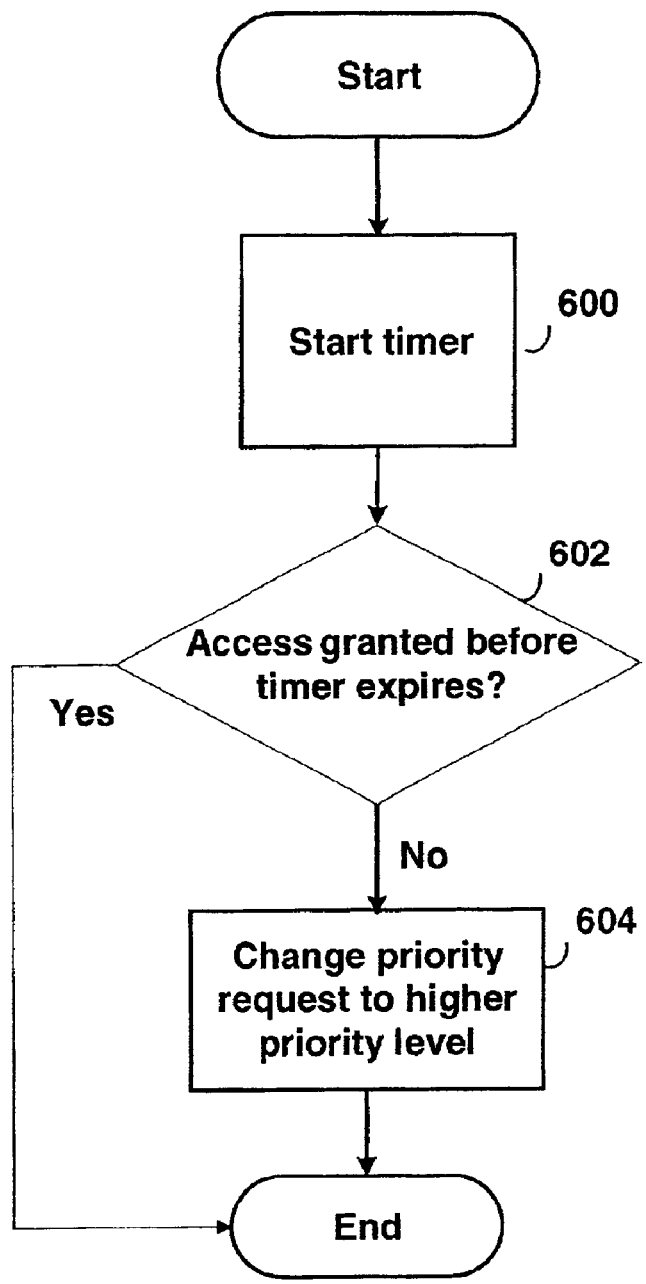
FIG. 6 is a flowchart illustrating another dynamic priority request algorithm for an agent in accordance with a further embodiment of the invention.

FIG. 6 is a flowchart illustrating the dynamic priority request algorithm in accordance with a further embodiment of the invention. Referring to FIG. 6A, the agent starts 600 the timer for timing a priority request for a predetermined time period. Then the agent determines 602 if the priority request is granted before the timer expires. If access has not been granted before the timer expires, the agent increases 604 the priority level of the request. Like the configuration register and the selector, the timer may be implemented in hardware. The predetermined time period of the timer is configurable by the user.

In addition to the embodiments hereinbefore described, many modifications and refinements which do not depart from the true spirit and scope of the invention may be conceived by those of ordinary skill in the art. For example, the arbitration algorithms for the arbiter need not be limited to fixed and round-robin. The number of work request queue fields and the number of corresponding threshold values may be larger or smaller. It is intended that all such modifications, including but not limited to those set forth above, be covered by the following claims.

What is claimed is:

1. A method of arbitrating priority requests for access to a resource for use in a computing system having an arbiter and the resource, the method comprising:

selecting a priority level corresponding to one of a plurality of different selections for a priority request, wherein at least one of the plurality of different priority selections is a dynamic priority level;

assigning a first priority level to the dynamic priority level;

increasing the dynamic priority level to a second priority level if the number of pending work requests in a work request queue rises above a first threshold value;

making the priority request at the selected priority level to the arbiter; and receiving access to the resource from the arbiter based on the priority level.

2. The method of claim 1 wherein selecting the priority level comprises choosing a priority value in a priority field stored in a configuration register.

3. The method of claim 1 wherein the priority request having the highest priority level receives access to the resource first.

4. The method of claim 1 wherein the arbiter determines priority when two or more of the priority requests are pending at the same priority level using a round robin scheme.

5. The method of claim 1 further comprising decreasing the dynamic priority level to a the first priority level if the number of pending work requests in the work request queue falls below a second threshold value.

6. The method of claim 1 further comprising increasing the dynamic priority level to third priority level if the number of pending work requests in the queue rises above a third threshold value.

7. The method of claim 1 further comprising increasing the dynamic priority level if a priority request fails to have access granted within a given time period.

8. The method of claim 5 further comprising decreasing the dynamic priority level to the second priority level if the number of pending work requests in the work request queue falls below a fourth threshold value.

9. The method of claim 5 wherein the first threshold value is higher than the second threshold value to provide hysteresis.

10. The method of claim 8 wherein the third threshold value is higher than the fourth threshold value to provide hysteresis.

11. A computing system comprising:

a resource;

a plurality of agents that make priority requests for access to the resource, each request having an assigned priority level, wherein each agent comprises:

a configuration register having a priority field for storing a plurality of different priority selections corresponding to the plurality levels which may be assigned to the priority requests, wherein at least one of the plurality of different priority selections is a dynamic priority level, and wherein at least one of the agents assigns a first priority level to the dynamic priority level, and a work request queue for storing pending work requests, wherein the agent increases the dynamic priority level of the priority request to a second priority level if the number of pending work requests in the work request queue rises above a first threshold value; and an arbiter, in communication with the plurality of agents and the resource, that receives priority requests for access from the agents and selectively grants the agents access to the resource based on the priority levels of the priority requests.

12. The computing system of claim 11 wherein the agent making the priority request having the highest priority level is granted access to the resource first.

13. The computing system of claim 11 wherein the agent decreases the dynamic priority level to the first priority level if the number of pending work requests in the work request queue falls below a second threshold value.

14. The computing system of claim 11 wherein the initial threshold value is higher than the second threshold value to provide hysteresis.

15. The computing system of claim 11 wherein the at least one agent further comprises a timer for timing the interval between the sending of each priority request to the arbiter and the granting of access to the resource.

16. The computing system of claim 13 wherein the agent increases the dynamic priority level to a third priority level if the number of pending work requests in the work request queue rises above a third threshold value.

17. The computing system of claim 15 wherein the agent increases the dynamic priority level of the priority request if the priority request fails to have access granted before the timer expires.

18. The computing system of claim 16 wherein the agent decreases the dynamic priority level to the second priority level if the number of pending work requests in the work request queue falls below a fourth threshold value.

19. The computing system of claim 18 wherein the third threshold value is higher than the fourth threshold value to provide hysteresis.

20. An agent for determining the priority of requests for access to a resource comprising:
   a configuration register for storing a set of priority levels, each of the priority levels corresponding to one of a plurality of different priority selections, wherein at least one of the plurality of different priority selections is dynamic;
   a selector for selecting one of the priority levels from the configuration register to include in a priority request to an arbiter for access to the resource, wherein the selector selects a first priority level to correspond to the dynamic priority level; and
   a work request queue for storing pending work requests;
   wherein the selector changes the priority request to a second priority level if the number of pending work requests in the work request queue rises above a first threshold value, wherein the second priority level is higher than the first priority level.

21. The agent of claim 20 wherein the selector changes the priority request to the first priority level if the number of pending work requests in the work request queue falls below a second threshold value.

22. The agent of claim 20 further comprising a timer for timing priority requests sent to the arbiter.

23. The agent of claim 21 wherein the selector changes the priority request to a third priority level if the number of pending work requests in the work request queue rises above a third threshold value, wherein the third priority level is higher than the second priority level.

24. The agent of claim 21 wherein the first threshold value is higher than the second threshold value to provide hysteresis.

25. The agent of claim 22 wherein the selector changes the priority request to a higher priority level if the priority request fails to have access granted before the timer expires.

26. The agent of claim 23 wherein the selector changes the priority request to the second priority level if the number of pending work requests in the work request queue falls below a fourth threshold value.

27. The agent of claim 26 wherein the third threshold value is higher than the fourth threshold value to provide hysteresis.

* * * * *